No. 817,603. PATENTED APR. 10, 1906.
C. H. WILLIAMS.
SEMAPHORE.
APPLICATION FILED DEC. 1, 1905.
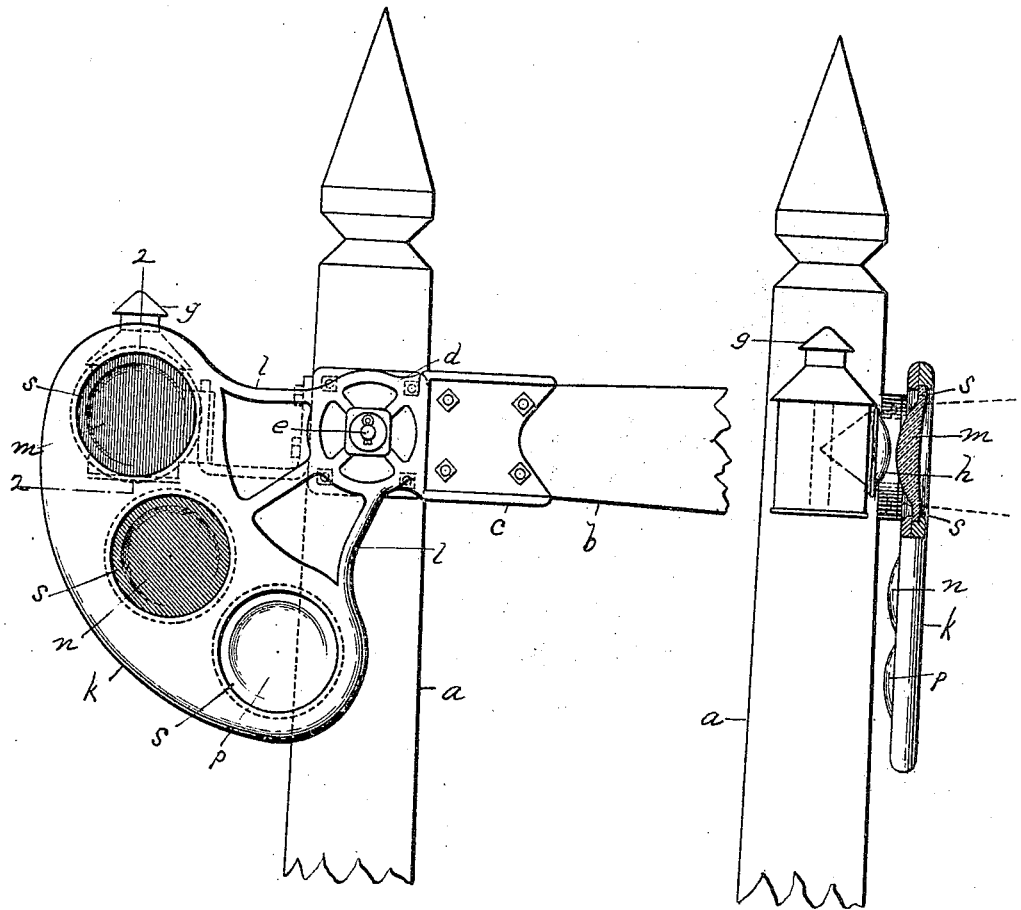
Fig. 1. Fig. 2.
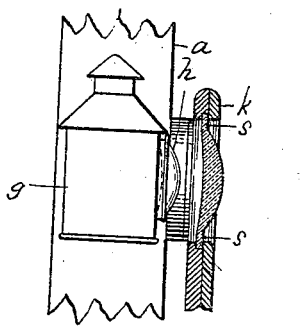 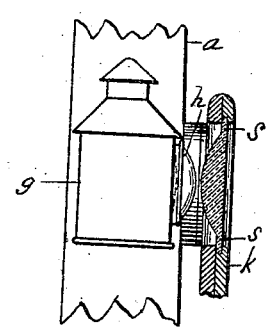 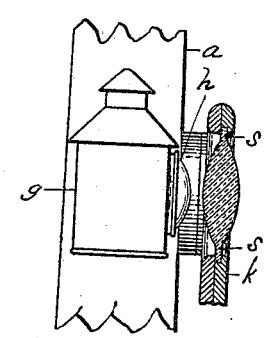
Fig. 3. Fig. 4. Fig. 5.
WITNESSES
A. K. Hood
M. A. Atwood
INVENTOR
Charles H. Williams
By his Atty.
Henry Williams

UNITED STATES PATENT OFFICE.

CHARLES H. WILLIAMS, OF MILTON, MASSACHUSETTS.

SEMAPHORE.

No. 817,603. Specification of Letters Patent. Patented April 10, 1906.

Application filed December 1, 1905. Serial No. 289,742.

*To all whom it may concern:*

Be it known that I, CHARLES H. WILLIAMS, a citizen of the United States, residing in Milton, in the county of Norfolk and State of Massachusetts, have invented a new and useful Improvement in Semaphores, of which the following is a specification.

This invention relates particularly to that class of semaphores in which lights of different colors are exhibited—such as red, green, and yellow, or colored and uncolored lights—the object usually being, especially if the semaphore is used in connection with a railway, to indicate "safety," "caution," or "danger" to an approaching train.

In semaphores as commonly constructed the lantern is provided with a lens, behind which is a light, and a swinging arm is furnished provided with one or more roundels—that is to say, glass disks with plane surfaces on both sides. Swinging a roundel of a particular color in front of the lens of the lantern indicates "danger," "safety," or "caution," as the case may be.

In the present improvement I combine with the lantern provided with a focalizing or concentrating lens a swinging arm or casting, which is provided with a series of lenses in place of the roundels previously used. By this means a lens in the arm or casting can be swung in front of and at a suitable distance from the lens in the lantern, whereby the focalizing is partly produced by the lens in the lantern and partly by the lens in the semaphore arm or casting. Hence it is possible to construct the lenses of less thickness and better shape than those now in use and make them of size and shape to fit the castings now in actual service. The lens in the lantern is made of uncolored glass and is preferably concavo-convex, and the lenses in the semaphore-casting may be made of red, green, and yellow glass, or red, green, and uncolored glass, or of any desired combination of colors. I prefer concavo-convex or plano-convex lenses for use in the semaphore arm or casting; but any suitable form of focalizing-lens may be employed.

As many castings now in use are constructed for roundels of greater diameter than the diameter of the lens in the lantern, I prefer to provide lenses for the castings which are of a particular form designed for this purpose, such form consisting of a central plano-convex, concavo-convex, or double-convex portion surrounded by an annular flange or rim, plane on both surfaces like a section of a roundel, integral with the lens proper and of sufficient diameter to fit the castings now in use. The central portion of the lens or the lens proper has a greater diameter than that of the lens in the lantern, and hence a larger illuminated area can be obtained than is the case with semaphores now in use. The lenses may be placed with their convex surfaces toward or from the lantern, as desired.

The nature of my invention is fully described below, and illustrated in the accompanying drawings, in which—

Figure 1 is a front elevation of a sufficient portion of a semaphore to illustrate my invention. Fig. 2 is a section of the same taken on line 2 2, Fig. 1. Figs. 3, 4, and 5 are similar sections showing slight modifications of the invention.

Similar letters of reference indicate corresponding parts.

$a$ represents the post of a semaphore, and $b$ the arm which carries the day-signals, said arm extending from a socket $c$, rigid with a hub or rotating frame $d$, pivoted to the front side of the post at $e$, all constructed substantially in the ordinary manner.

$g$ represents the case of the lantern, constructed substantially as usual and provided with a focalizing lens $h$, preferably concavo-convex, of uncolored glass.

$k$ is a curved arm integral with the hub $d$ by means of the connections $l$, said arm $k$, connections $l$, hub $d$, and socket $c$ being preferably of a single casting.

Supported in the arm $k$ are a series of lenses $m$ $n$ $p$ set in a line which is in the arc of a circle whose center is at $e$ and at a distance from said center which is equal to the distance of the lantern-lens $h$ therefrom. These lenses may be of different colors or two of them may be of different colors and one uncolored, as indicated in the drawings, in which $m$ represents a red lens, $n$ a green lens, and $p$ an uncolored lens, indicating, respectively, "danger," "caution," and "safety." The arm $k$ is located at a suitable distance from the lantern-lens $h$ to obtain the best results from the focalizing of the lantern-lens and the focalizing of the lens in the arm $k$, which is swung in front of the lantern-lens, and by suitably arranging said lenses with relation to each other they can be of less thickness than would be the case if the whole focalizing of the light were done by the lens in the lantern in connection with a roundel in the semaphore-casting. All these lenses are surrounded by similar annular flanges or rims $s$ plane on both surfaces, the flanges or rims and the lenses or central portions $m$, $n$, and $p$ being in each case integral and constituting practically a single lens which is of greater diameter than the lantern-lens $h$ and which will fit in a casting or arm constructed originally to receive roundels, which are generally made larger in diameter than the lantern-lens.

Referring to Figs. 1 and 2, it will be seen that the lenses $m$, $n$, and $p$ are concavo-convex. It is not necessary, however, that they should be concavo-convex, as they may be plano-convex, as indicated in Fig. 4, or double-convex, as indicated in Fig. 5. Of course it is always necessary that one surface should be convex; otherwise it would not be a focalizing-lens. Moreover, it is not essential that the convex surface of the lens should face the lantern-lens, as illustrated in Figs. 1 and 2, as the lens may be so disposed that the convex-surface will be farther from the lantern-lens, as illustrated in Fig. 3. I prefer, however, that the lens, whether placed with its concave or convex side toward the lantern-lens, should be concavo-convex or plano-convex.

All the lenses employed in this invention or improvement have smooth surfaces without concentric shoulders or grooves, thus avoiding shadows and reducing the danger of the collection of dust and dirt to a minimum and enabling the lenses to be easily cleaned.

Having thus fully described my invention, what I claim, and desire to secure by Letters Patent, is—

1. In a semaphore, a lantern having a lens of only partial concentrating power, and two or more supplementary lenses with means to bring them successively in front of said lantern-lens, said lenses being also of partial concentrating power, whereby, by the combined action of the lantern-lens and the supplementary lens, the lantern-rays are properly focalized, substantially as specified.

2. In a semaphore, a lantern having a lens with one convex face, and a pivoted radius-arm mounted to swing in front of said lens, in which are mounted two or more lenses adapted to come in succession before the lantern-lens by the swinging of the radius-arm, said radius-arm lenses being of a curvature such as to supplement the lantern-lens in properly focalizing the illuminating-rays from the lantern, substantially as specified.

3. In a semaphore, a lantern having a lens of only partial concentrating power, and a semaphore-arm in which are mounted two or more lenses also of partial concentrating power, adapted to be brought by the movement of said arm successively in front of said lantern-lens and coöperate with the latter to properly focalize the lantern-rays, said supplementary lenses being of larger diameter than that of the lantern-lens, substantially as specified.

4. In a semaphore, a lantern-lens of partial condensing power and two or more supplementary lenses also of partial condensing power, mounted to come in succession before said lantern-lens, at a suitable distance therefrom to coöperate with the latter in properly focalizing the lantern-rays, substantially as specified.

5. In a semaphore, in combination with the lantern and lens thereof; a signal-arm, and lenses secured therein and thereby adapted to be swung up in front of the lantern-lens, said signal-lenses consisting of a central lens-shaped portion and an annular flange or rim plane on both surfaces or sides and integral with the said central portion, whereby the light may be focused partly by the lantern-lens and partly by the signal-lens.

6. In a semaphore, in combination with the lantern and lens thereof; a signal-arm, and lenses having one convex surface and secured therein and thereby adapted to be swung up in front of the lantern-lens, said signal-lenses consisting of a central lens-shaped portion and an annular flange or rim plane on both surfaces or sides and integral with the said central portion, whereby the light may be focused partly by the lantern-lens and partly by the signal-lens.

7. In a semaphore, in combination with the lantern and lens thereof; a signal-arm, and concavo-convex lenses secured therein and thereby adapted to be swung up in front of the lantern-lens, said signal-lens consisting of a central lens-shaped portion and an annular flange or rim plane on both surfaces or sides and integral with the said central portion, whereby the light may be focused partly by the lantern and partly by the signal-lens.

In testimony whereof I have signed my name to this specification in the presence of two subscribing witnesses.

CHARLES H. WILLIAMS.

Witnesses:
   HENRY W. WILLIAMS,
   A. K. HOOD.